Feb. 24, 1931.  G. A. JOHNSON  1,793,697

CABLE SHIELD

Filed May 21, 1929

INVENTOR.
GUSTAVE A. JOHNSON
BY
George D. Richards
ATTORNEY

Patented Feb. 24, 1931

1,793,697

UNITED STATES PATENT OFFICE

GUSTAVE A. JOHNSON, OF IRVINGTON, NEW JERSEY

CABLE SHIELD

Application filed May 21, 1929. Serial No. 364,728.

This invention relates, generally, to armored electric conducting cables; and the invention has reference, more particularly, to novel means for protecting the cable insulation and conductors from injury commonly caused by the abrading action of the cable armor.

The invention has for its principal object to provide a novel shield or shields adapted to be inserted between the cable armor and the cable insulation and having means for protecting the cable insulation from the abrading action of the edge formed at the end of the cable armor.

Another object of the invention lies in the provision of a novel shield or shields of the above character so constructed and arranged as to permit of the ready insertion of the same between the cable armor and the cable insulation but which cannot be accidentally removed therefrom.

Still another object of the present invention is to provide a shield or shields of the above character of simple construction and reliable in use.

Heretofore some use has been made of plain bushings generally of insulating material which bushings have been inserted between the cable armor and the conducting wires. Such plain bushings, however, have been unsatisfactory in use not only because it is generally necessary to remove a portion of the cable insulation from under the cable armor in order to insert the bushing thereunder but principally because such bushings have a tendency to be squeezed or to work out from under the cable armor, thereby becoming useless and causing the imperfectly insulated conducting wires of the cable to be subjected to the detrimental abrasive action of the rough end of the cable armor tending to result in short circuits or other circuit troubles.

The novel shield of this invention is so constructed and arranged as to be insertable between the cable insulation and the cable armor without the necessity of removing any of the cable insulation and which has a barb or barbs for interlocking with the cable armor to thereby positively retain the shield in desired position under the end portion of the cable armor.

Other objects of this invention not at this time more particularly enumerated, will be clearly understood from the following detailed description of the same.

The invention is clearly illustrated in the accompanying drawings, in which:—

Similar characters of reference are employed in all of the hereinabove described views, to indicate corresponding parts.

Figure 1:
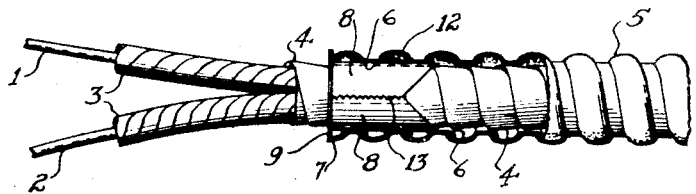
Fig. 1 is a view in elevation of an armored cable equipped with the novel protective cable shields of this invention, portions of the cable armor being broken away showing the positioning of the shields over the cable insulation.
Figure 2:
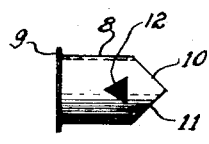
Fig. 2 is an elevational view of one of the cable shields of Fig. 1.
Figure 3:
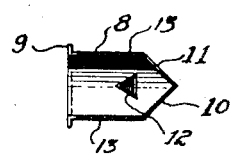
Fig. 3 is a rear view of the structure shown in Fig. 2.

Referring now to Figs. 1 to 3 of the drawings, the novel protective cable shields of this invention are illustrated as applied to a cable having two conducting wires, which is the form most commonly employed for general wiring purposes, but it is to be understood that the novel shield of this invention may be also applied to cables containing either a single wire or those containing more than two wires. The conducting wires 1 and 2 are commonly made of conducting material, such as copper and these wires are provided with a suitable primary insulation 3 which may be of rubber composition or other suitable material such as impregnated paper. A covering and insulating fibre or other tape 4 is illustrated as wound spirally upon the primary insulation 3. A plurality of such tapes 4 are sometimes wound in successive overlying layers upon the insulation 3. A metallic armor or casing 5 surrounds the tape 4 and completes the cable construction. Armor 6 consists of a metallic strip of substantially S-shaped cross-section wound helically with its convolutions suitably interlocked one with another, but so as to allow a reasonable degree of flexing or beading, in the manner familiar to those skilled in the art. One half of the S-shaped cross-section of the metallic armor 5 projects inwardly of the outer periphery of the armor forming a continuous internal spiral bead 6 having a concave outer surface. The other half of the S-shaped cross-section of the metallic armor projects outwardly in convex form.

In using the armored cable, it is generally necessary to cut the armor off for some distance from the ends of the cable so as to expose the insulated wires 1 and 2 preparatory for handling as shown in Fig. 1. In cutting the armor 5, the end edges 7 thereof are generally left somewhat rough and sharp and tend to cut or injure the insulation 3 and 4 when the cable is flexed in use, thereby tending in time to short circuit or damage the wires 1 and 2.

According to the preferred arrangement, a pair of duplicate cable shields 8—8 are adapted to be inserted into the end of the metallic armor 5 in surrounding relation to the tape 4 for the purpose of protecting the exposed end portions of insulated wires 1 and 2 and the tape 4 from the more or less rough and somewhat sharp edge 7 formed on the end of the metallic casing 5. Cable shields 8 are of substantially hollow semi-cylindrical shape and are made of a suitable tough insulating material such as compressed fiber or enameled metal. Each shield 8 is formed with a semi-annular flange 9 projecting outwardly from one end portion thereof, which flange is adapted to overlie the edge 7 of the armor 5 when the shield is assembled upon the cable, to thereby protect the inner parts of the cable structure from the edge 7. The other end portion of the shield 8 is formed with converging edges 10 and 11 that terminate in a point which construction facilitates the ready insertion of the shield 8 between the armor 5 and tape 4. A barb 12 is struck outwardly from the shield 8 and is adapted to engage the interior wall of the armor 5 and particularly a side of the bead 6 for the purpose of retaining the shield in desired fixed position upon the cable. Barb 12 is positioned substantially in longitudinal alignment with the point formed by edges 10 and 11 and is directed outwardly and towards the flange 9. When shield 8 is inserted between armor 5 and insulation 4 the armor rides over the barb 12 and this barb has sufficient resiliency so as to be readily deflected inwardly or temporarily collapsed, thereby permitting the easy insertion of the shield. With the shield 8 inserted into desired position between the armor 5 and insulation 4, however, any tendency thereafter for the shield to be moved outwardly of the metallic casing is prevented by the action of barb 12 which engages the side of bead 6 to prevent such motion, as especially illustrated in Fig. 1.

The longitudinal side edges of each of the shields 8 are illustrated as being provided with serrations or interlocking lugs 13 which are adapted to interfit with similar serrations provided on the adjoining shield 8. The serrations 13 serve to lock the two shields 8—8 together within casing 5 and prevent any relative motion of these shields. Hence it is merely necessary for the barb 12 of one of the shields 8 to engage a side of the bead 6 to prevent outward motion of either or both of the shields 8. Also, any tendency for these shields to move outwardly from between casing 5 and insulation 4 is further resisted by the frictional contact of the cable members upon the shields.

Figure 4:
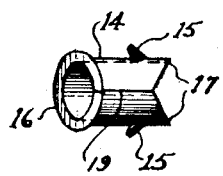
Fig. 4 is a perspective view of a slightly modified form of shield.

In the form of the invention illustrated in Figure 4, a single substantially cylindrical shield 14 is adapted to be passed over the insulated wires 1 and 2 and inserted between the insulation 4 and the armor 5. Shield 14 is preferably longitudinally split at one side as at 19 and is provided with diametrically opposite barbs 15 either or both of which are adapted to engage the bead 6 formed on the interior of the armor 5. Shield 14 is provided with inner pointed portions 17 to facilitate the ready insertion of this shield between the cable armor and its insulation. A single annular flange 16 is provided on the outer end of the shield 14 and is adapted to overlie the edge 7 of the armor 5.

It will be noted that with either of the novel shields 8 or 14 inserted between the cable insulation and the cable casing it is impossible for the insulation 4 or 3 or the wires 1 and 2 to contact with the rough edge of the armored casing regardless of the flexing of the cable or of the free ends of the wires 1 and 2 with respect to the cable casing, since the novel shields of this invention positively prevent any contact of the metal of the casing with the insulation of the wires 1 and 2. The use of the barbs 12 and 15 positively insures the retention of the shields in the desired position between the casing and cable insulation.

When assembling the shields upon the cable it is not necessary to pass the same over the ends of wires 1 and 2, for these shields may be applied about the conductors at a point adjacent the end of the armor casing and then inserted directly under the armor casing. The pointed inner ends of the shields enable the quick and easy insertion of the shields between the cable armor and insulation without the necessity of removing any of the cable insulation which is highly desirable.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In combination with an armored cable having a cable armor and an insulated conductor contained within and having an end portion projecting outwardly from an end of said cable armor, a shield of insulating material for protecting the projecting end portion of said insulated conductor from the abrasive action of the end of said cable armor, said shield being interposed between the insulation of said conductor and the inner surface of said cable armor, and having a portion overlying the end of said cable armor and locking means formed on said shield for engaging said cable armor to retain said shield in desired position, said locking means consisting of a barb struck outwardly from the body of said shield.

2. In combination with an armored cable having a cable armor, insulated conductors extending side by side within said cable armor and having end portions projecting outwardly from and end of said cable armor, and additional insulation wrapped around said conductors and fitting snugly within said cable armor, a shield having a converging inner end portion interposed between said additional insulation and said cable armor, said converging end portion facilitating the ready insertion of said shield under said cable armor, said shield having a marginal flange on its outer end portion overlying the end of said cable armor, and a barb formed on said shield and engaging said cable armor for retaining said shield in place between said armor and said additional insulation.

3. In combination with an armored cable having a cable armor, insulated conductors extending side by side within said cable armor and having end portions projecting outwardly from an end of said cable armor and additional insulation wrapped around said conductors and fitting snugly within said cable armor, substantially semi-cylindrical shields interposed between said additional insulation and said cable armor, said shields having interengaging abutting longitudinal edges and locking means provided on said shields and engaging the inner surface of said cable armor for retaining said shields in fixed position with respect to said cable armor.

4. In combination with an armored cable having a cable armor, insulated conductors extending side by side within said cable armor and having end portions projecting outwardly from an end of said cable armor and additional insulation wrapped around said conductors and fitting snugly within said cable armor, substantially semi-cylindrical shields interposed between said additional insulation and said cable armor, said shields having interengaging abutting longitudinal edges and adapted to protect the insulated conductors and the additional insulation from the abrasive action of the end of the cable armor.

In testimony, that I claim the invention set forth above I have hereunto set my hand this 20th day of May, 1929.

GUSTAVE A. JOHNSON.